United States Patent
Iori et al.

[11] Patent Number: 5,623,337
[45] Date of Patent: Apr. 22, 1997

[54] METHOD CAPABLE OF QUICKLY ADJUSTING AN OPTICAL AXIS OF AN OPTICAL FIBER

[75] Inventors: Hiroko Iori; Akio Ukita, both of Tokyo, Japan

[73] Assignee: NEC Corporation, Tokyo, Japan

[21] Appl. No.: 534,824

[22] Filed: Sep. 27, 1995

[30] Foreign Application Priority Data

Sep. 28, 1994 [JP] Japan .................................. 6-233350
Mar. 22, 1995 [JP] Japan .................................. 7-062823

[51] Int. Cl.$^6$ .............................. G01B 11/26; G02B 6/42
[52] U.S. Cl. .......................... 356/153; 356/400; 385/90; 385/91
[58] Field of Search ................... 356/153, 400; 385/90, 91

[56] References Cited

U.S. PATENT DOCUMENTS 4,884,015  11/1989  Sugimoto et al. .................. 385/90
5,029,965   7/1991  Tan .................................... 385/90

FOREIGN PATENT DOCUMENTS

1180507  7/1989  Japan .

Primary Examiner—F. L. Evans
Attorney, Agent, or Firm—Sughrue, Mion, Zinn, Macpeak & Seas

[57] ABSTRACT

In a method of adjusting an optical axis of an optical fiber to a beam axis of a light beam of an optical element, light power values are measured at a plurality of positions to define a specific function which is determined by the light power values and the positions and which has a specific maximum value at a specific maximum position. The optical fiber and the optical element are relatively moved to the specific maximum position to measure a measured light value at the specific maximum position. The specific function is modified by the use of the measured light value to relatively move the optical fiber and the optical element to a final position. Such adjustment may be made three-dimensionally and/or rotatably. On rotatable adjustment, a predetermined value may be set instead of the specific maximum value.

15 Claims, 7 Drawing Sheets

METHOD CAPABLE OF QUICKLY ADJUSTING AN OPTICAL AXIS OF AN OPTICAL FIBER

BACKGROUND OF THE INVENTION

This invention relates to an optical axis adjustment method of adjusting an optical axis of an optical fiber to a beam axis of an optical element, such as a semiconductor laser device, a light emitting diode, or the like.

In general, it often happens that an optical element and an optical fiber are assembled into an optical module in order to transmit a light beam from the optical element through the optical fiber. In this event, an optical axis of the optical fiber must be precisely aligned with or adjusted to a beam axis of a light beam emitted from the optical element. Such adjustment of an optical axis to a beam axis should be made three-dimensionally and rotatably around the optical axis of the optical fiber. Otherwise, a maximum quantity of light can not be transmitted through the optical fiber.

Taking the above into consideration, the optical fiber and the optical element are relatively moved in a three-dimensional coordinate, for example, an orthogonal coordinate of x-y-z. In addition, the optical fiber is rotated around the optical axis thereof relative to the optical element to adjust the rotational angle of the optical fiber to that of the optical element.

At any rate, the adjustment of the optical fiber to the optical element is accomplished by monitoring a maximum quantity or value of the light beam emitted from the optical fiber. The quantity or value of the light beam emitted from the optical fiber may be also referred to as a light power value.

More specifically, a maximum value emitted from the optical fiber is detected along each of an x-axis, a y-axis, and a z-axis and rotatably around the optical axis of the optical fiber, when the optical axis of the optical fiber is adjusted to the beam axis of the light beam emitted from the optical element. To this end, a measured value measured at a certain position of the optical fiber is compared with another measured value measured at another position shifted from the certain position by a predetermined pitch. Thereafter, the maximum measured value is selected from the measured values. Similar operation is successively repeated to detect the maximum value of the light beam along each of the x-, the y-, and the z-axes and around the optical axis of the optical fiber. As a rule, such operation may be called a hill-climbing method.

However, when an actual maximum position at which the maximum value is measured is very far from a current position, the comparisons should be repeated many times. This shows that a very long time is taken to search for the maximum value of the light beam along each axis and around the optical axis.

SUMMARY OF THE INVENTION

It is an object of this invention to provide a method which adjusts an optical axis of an optical fiber to a beam axis of a light beam of an optical element and which can quickly align the optical axis with the beam axis of the light beam.

It is another object of this invention to provide a method of the type described, which can quickly adjust the optical axis of the optical fiber to the beam axis three-dimensionally.

It is still another object of this invention to provide a method of the type described, which is suitable for adjusting an angle of the optical fiber to that of the beam axis.

A method to which this invention is applicable is for use in adjusting an optical fiber to an optical element to align an optical axis of the optical fiber with a beam axis of a light beam emitted from the optical element. The optical fiber has a first end adjacent to the optical element and a second end remote from the optical element. According to an aspect of this invention, the method comprises the steps of relatively moving the optical fiber and the optical element so that the light beam is transmitted through the optical fiber from the first end to the second end and has a light distribution on the second end, selecting a preselected function which approximates the light distribution, measuring the light beam transmitted through the optical fiber at a plurality of positions on the second end to obtain measured results of the light beam at the respective positions, and relatively positioning the optical fiber and the optical element by the use of the measured results and the preselected function so as to align the optical axis of the optical fiber with the beam axis of the light beam. The preselected function has a convex form which has a peak value when the light distribution has a maximum value at a maximum value position.

Another process to which this invention is applicable is for use in rotatably adjusting an optical fiber to an optical element to transmit a light beam between the optical fiber and the optical element. The optical fiber has an end and an optical axis. The light beam is transmitted between the optical fiber and the optical element in a transmission quantity of light which has an optimum value and a light distribution when the optical fiber is rotated around the optical axis relative to the optical element. According to another aspect of this invention, the method comprises the steps of selecting a family of function which approximates the light distribution, measuring the transmission quantity of light at a plurality of angle positions around the optical axis on the end to obtain measured results at the respective angle positions, determining the parameters of the continuous function from the measured results, and calculating a preferred rotation angle between the optical fiber and the optical element on the basis of the specifically calculated continuous function so that the transmission quantity of light becomes substantially equal to the optimum value.

DESCRIPTION OF THE PREFERRED EMBODIMENTS

Figure 1:
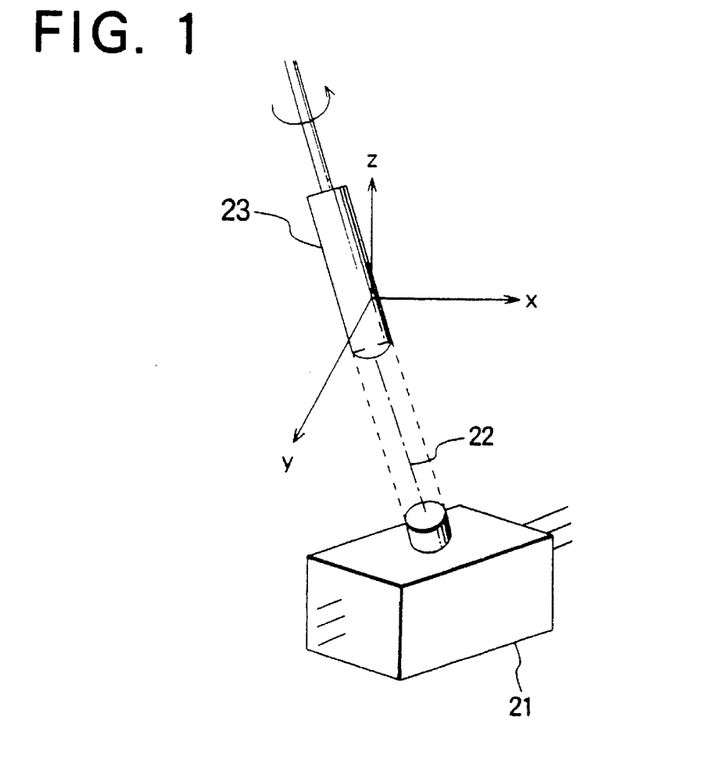
FIG. 1 shows a perspective view for use in describing an adjustment operation of an optical axis to a beam axis.

Referring to FIG. 1, description will be made as regards a conventional optical axis adjustment method which is used for an optical module illustrated in FIG. 1 and which is substantially equivalent to that described in Japanese Unexamined Patent Publication No. Hei 1-180,507, namely, 180,507/1989. The optical module comprises an optical element 21 which may be, for example, a semiconductor laser device and which emits a light beam in a predetermined direction along an optical axis 22 (will be called a beam axis). The optical element 21 is assembled together with an optical fiber 23 to form the optical module. The optical fiber 23 has a first end adjacent to the optical element 21, a second end (not shown) remote from the optical element 21, and a fiber axis which will be called an optical axis hereinunder.

On assembling the optical element 21 and the optical fiber 23, both the optical element 21 and the optical fiber 23 should be optically coupled to each other so that light transmission efficiency becomes maximum. To this end, the optical axis of the optical fiber 23 must be precisely aligned with the beam axis 22 of the light beam emitted from the optical element 21. Thereafter, the first end of the optical fiber 23 and the optical element 21 are welded together into the optical module via a sleeve or similar and consequently fixed to each other.

In order to adjust the optical axis of the optical fiber 23 to the beam axis 22 of the optical element 21, the optical axis and the beam axis 22 should first be three-dimensionally adjusted to each other. Specifically, an orthogonal coordinate system which is defined by an x-axis, a y-axis, and a z-axis is determined within a space over the optical element 21, as shown in FIG. 1. The z-axis is extended along the beam axis 22 while the x- and the y-axes are orthogonal to each other and to the z-axis.

In this situation, the optical fiber 23 is arranged in substantial parallel with the beam axis 22 of the optical element 21. As shown in FIG. 1, the first end of the optical fiber 23 is close to the optical element 21. Under the circumstances, the optical fiber 23 and the optical element 21 are relatively moved along the x-axis, the y-axis, and the z-axis to adjust the optical axis of the optical fiber 23 to the beam axis 22 of the optical element 21. Such relative adjustment may be referred to as x-y-z adjustment.

Figure 2:
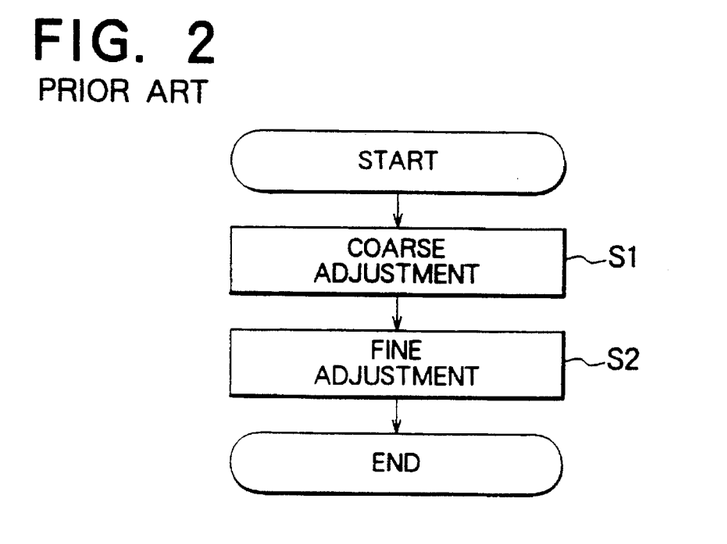
FIG. 2 is a time chart of a conventional method for adjusting the optical axis to the beam axis.

Referring to FIG. 2, the relative adjustment mentioned above will be described in detail together with FIG. 1. Prior to the relative adjustment, the optical element 21 is fixed on an x-y table (not shown) which is movable along the x-axis and the y-axis. In this case, the beam axis 22 of the optical element 21 is directed along the z-axis. On the other hand, the optical fiber 23 is fixed to another table (called a z table) movable along the z-axis so that the first end of the optical fiber 23 is directed towards the optical element 21. The second end of the optical fiber 23 is fastened to a sensor which monitors a quantity (namely, a light power value) of the light beam transmitted through the optical fiber 23.

In the conventional method, the relative adjustment is started and proceeds to a first step S1 at which coarse adjustment is carried out. The coarse adjustment is divided into focus search and surface search. On the focus search, the optical fiber 23 is shifted relative to the optical element 21 along the z-axis at a predetermined pitch so as to detect a position at which a maximum light power value is obtained. Specifically, a hill-climbing method is used to determine the position of the optical fiber 23 along the z-axis by the focus search.

During the surface search, the optical element 21 is moved relative to the optical fiber 23 in two directions along the x-axis and the y-axis at preselected pitches. In this event, the hill-climbing method is also used to detect further maximum light power values along the x-axis and the y-axis.

While the coarse adjustment is being carried out, the focus search and the surface search are alternately repeated to determine coarse positions of the optical fiber 23 and the optical element 21 along the x-axis, the y-axis, and the z-axis.

Thereafter, the first step S1 is shifted to a second step S2 at which fine adjustment is carried out by the use of surface search, as shown in FIG. 2. The surface search in the fine adjustment is made by the use of the hill-climbing method in the both directions along the x-axis and the y-axis at a pitch which is smaller than the preselected pitches in the coarse adjustment. After the fine adjustment is completed, the rotational angle of the optical fiber 23 is practically adjusted relative to the optical axis of the optical fiber 23 by the use of the hill-climbing method, although not shown in FIG. 2.

Figure 3:
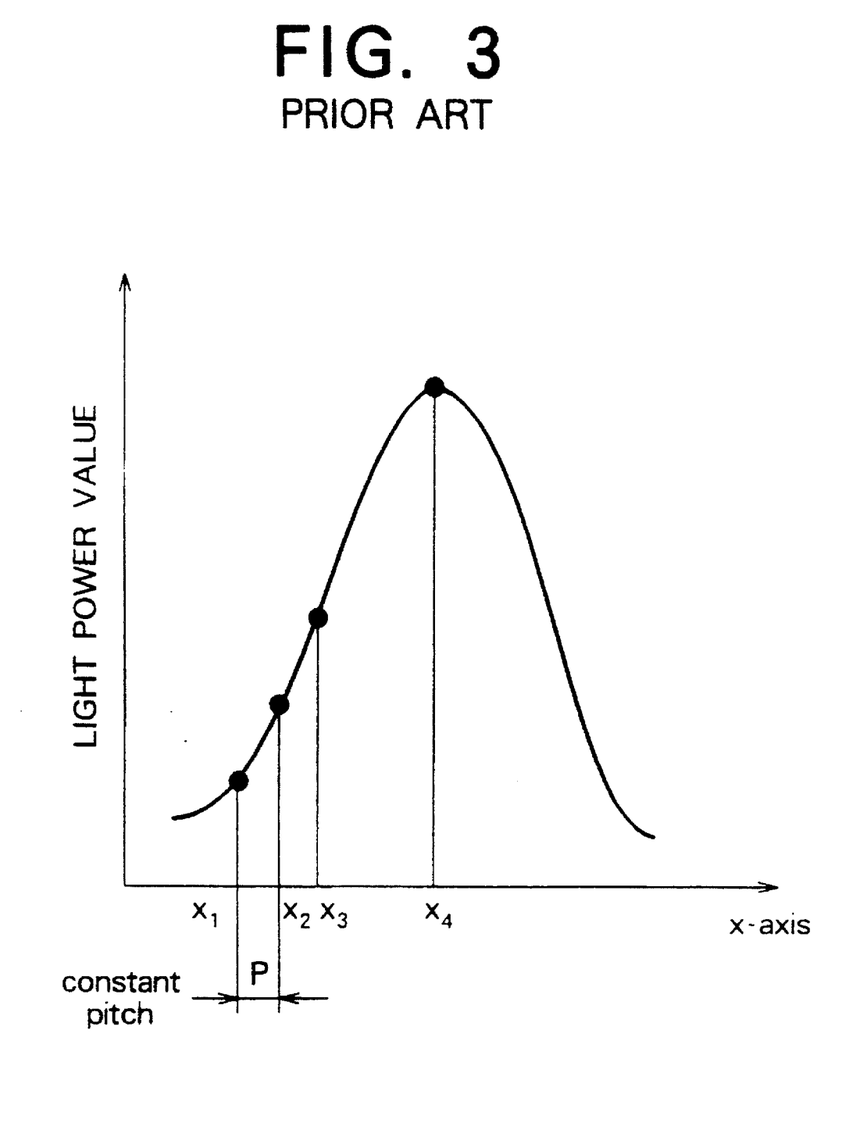
FIG. 3 shows a graphical representation for use in describing the conventional operation.

Referring to FIG. 3, description will be directed to the hill-climbing method which is used in the coarse adjustment and the fine adjustment, as mentioned in connection with FIG. 2. Herein, it is noted that the hill-climbing method is independently applied on adjustment along the x-axis, the y-axis, and the z-axis and on adjustment of the angle around the optical axis of the optical fiber 23. However, operation of the hill-climbing method is common to each adjustment.

Taking the above into consideration, the hill-climbing method will be described on the assumption that adjustment between the optical element 21 and the optical fiber 23 is made along the x-axis illustrated in FIG. 1.

In FIG. 3, an abscissa and an ordinate represent a position along the x-axis and the light power value, respectively. It is assumed that measurement positions are successively changed from $x_1$ to $x_4$ at a constant pitch p on the x-y table. In the hill-climbing method, the light power value is at first measured at the position $x_1$ by the sensor attached to the second end of the optical fiber 23. Subsequently, the light power value is again measured at the position $x_2$ which is spaced from the position $x_1$ by the constant pitch p.

When the light power value at the position $x_2$ is greater than that at the position $x_1$, the x-y table is moved by the constant pitch p along the x-axis to be shifted to the position $x_3$. Subsequently, when the light power value is also measured at the position $x_3$ by the sensor and is greater than that at the position $x_2$, the x-y table is further shifted along the x-axis.

As long as the light power value measured is increased at each position, as mentioned before, the x-y table is repeatedly shifted along the x-axis while the measurement is repeated at every position shifted along the x-axis. In the example being illustrated, a reduction of the light power value is measured when the measurement is carried out at a position located beyond the position $x_4$. In this event, a measurement point is returned back to the position $x_4$. Thereafter, the light power value measured at the position $x_4$ is determined as a maximum light power value or a peak value along the x-axis. Thus, the maximum light power value is found by the hill-climbing method.

With this hill-climbing method, a very long time is required to detect the maximum light power value when an initial position, such as $x_1$, is far from a peak position, such as $x_4$, as mentioned in the preamble of the instant specification.

Figure 4:
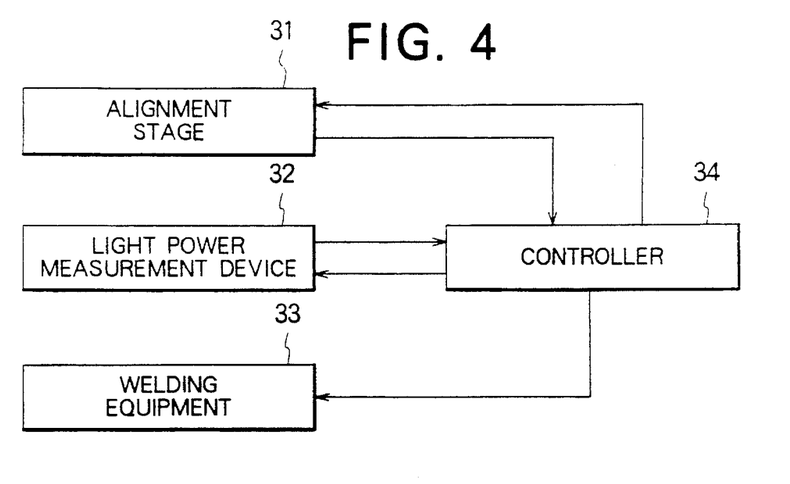
FIG. 4 is a block diagram of an optical module assembly system according to this invention.

Referring to FIG. 4 together with FIG. 1, an optical module assembly system is used in assembling the optical element 21 and the optical fiber 23 (shown in FIG. 1) into an optical module in accordance with an optical axis adjustment method according to this invention. In the illustrated example, the optical element 21 may be considered as a semiconductor laser device.

In the optical module assembly system, an alignment table, stage or 31 moves the semiconductor laser device 21 along the x-axis and the y-axis and moves the optical fiber 23 along the z-axis. This shows that the alignment stage 31 may be understood as a combination of the x-y table and the z table. In addition, a light power measurement device 32 is also included in the optical module assembly system to measure a light power value of the light beam which is emitted from the semiconductor laser device 21 and transmitted through the optical fiber 23. Welding equipment 33 is prepared to weld the semiconductor laser device 21 and the optical fiber 23 together after alignment is completed.

The alignment stage 31, the light power measurement device 32, and the welding equipment 33 are all controlled by a controller 34 in a manner to be described later in detail.

Figure 5A:
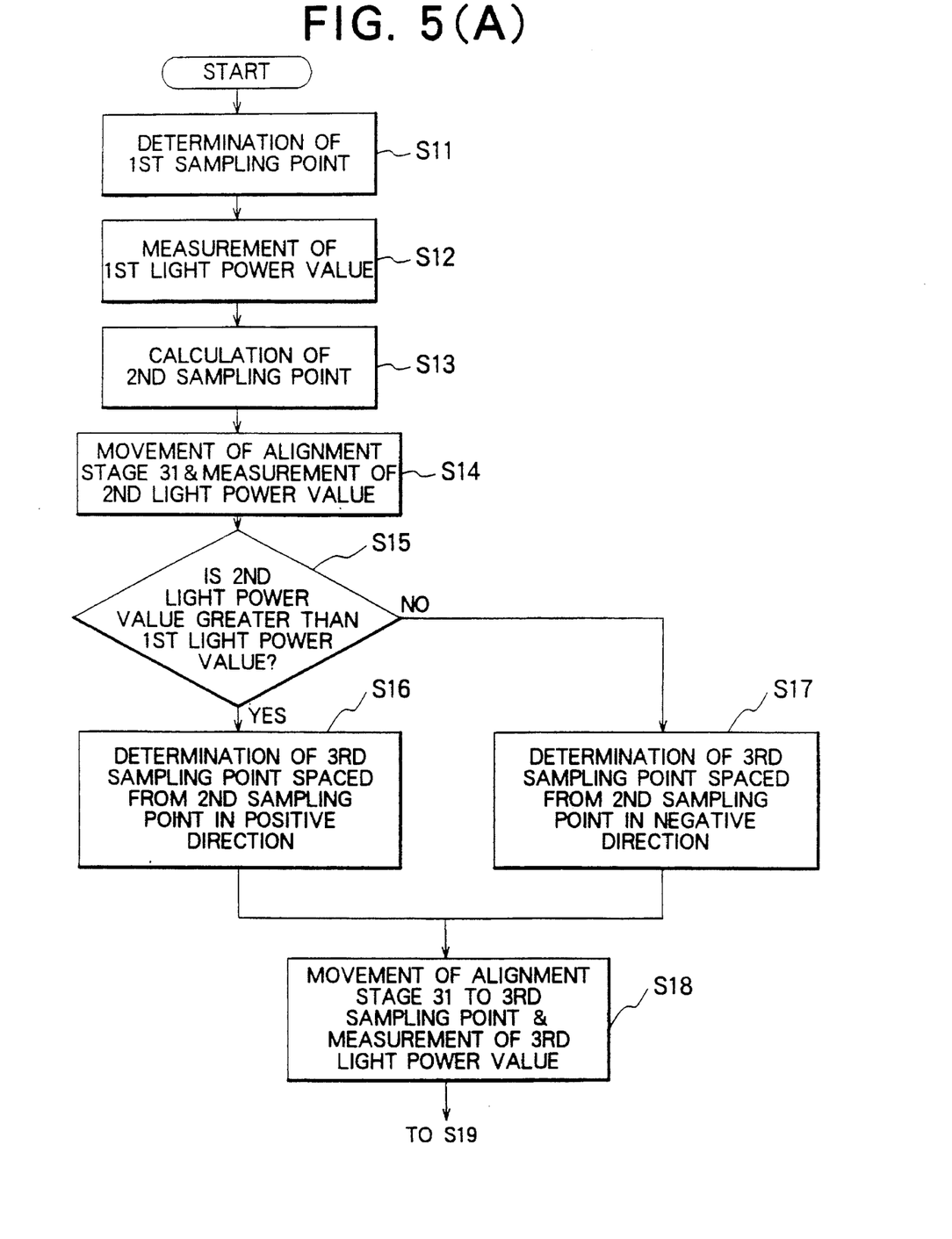
FIGS. 5(A) and 5(B) are flow charts for describing operation of an optical adjustment method according to a first embodiment of this invention.
Figure 5B:
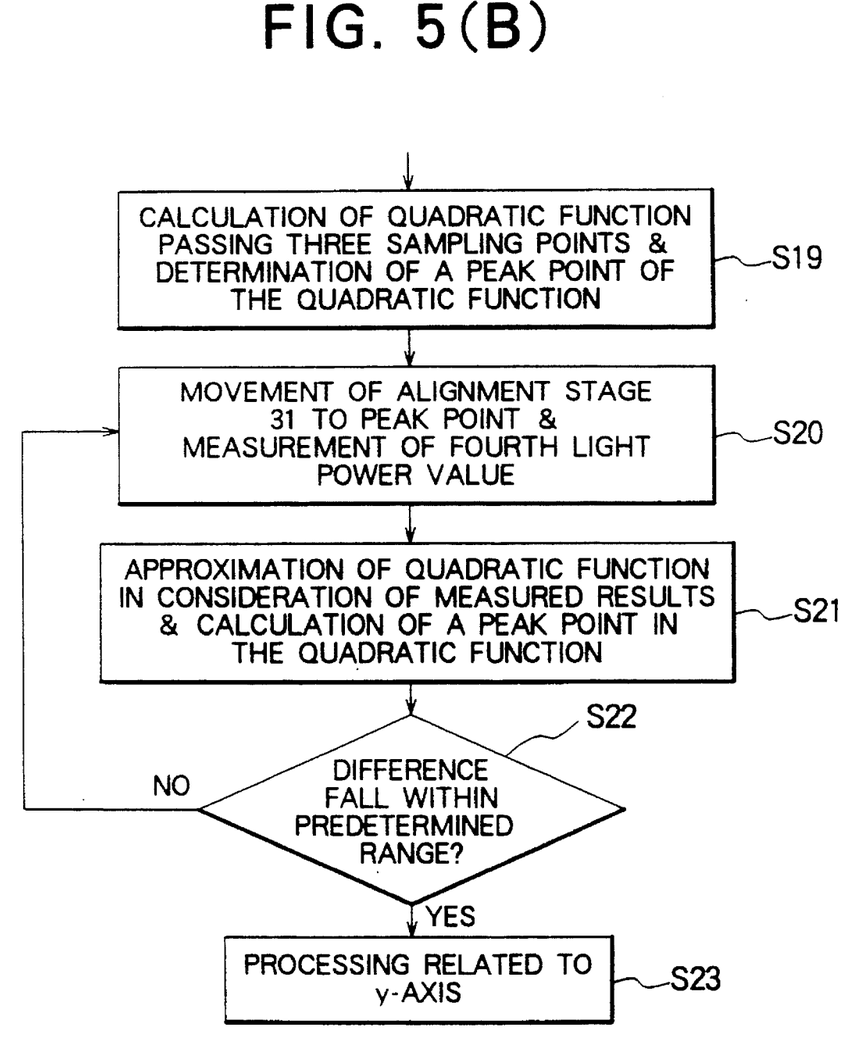

Referring to FIGS. 5(A) and 5(B) in addition to FIGS. 1 and 4, the optical axis adjustment method is assumed to be carried out so as to move the semiconductor laser device 21 along the x-axis on the alignment stage 31 and to detect a maximum one of the light power values in an x-axis direction. This shows that the orthogonal coordinate system is defined in FIGS. 5(A) and 5(B) in the manner illustrated in FIG. 1. The above-mentioned maximum light power value may be also referred to as a peak value.

According to this invention, the controller 34 is operated to determine the maximum light power value on the assumption that a light power distribution in the x-axis direction can be approximated or specified by a convex type of function which has a single peak value, namely, a single maximum light power value.

Families of convex function, such as a quadratic function, an exponential function, or a fractional function are well known in the art. On the assumption that a common convex function is used to determine the peak values along the x-axis, the y-axis, and the z-axis, let a variable in the convex function be represented by s hereinunder.

In that case, the quadratic function is given by:

$$P = a \cdot s^2 + b \cdot s + c, \quad (1)$$

where P represents a light power value measured by the light power measurement device 32 (FIG. 4); a, b, and c represent constant values or coefficients; and a is not equal to zero.

On the other hand, when the exponential function is used, the light power value P is represented by:

$$P = b \cdot \exp(-(a \cdot (s + c))^2), \quad (2)$$

where a, b, and c are representative of constants different from those in Equation 1; a is not equal to zero; and b is greater than zero.

Furthermore, the fractional function is specified by:

$$P = 1/(a \cdot s^2 + b \cdot s + c), \quad (3)$$

where a, b, and c are constants differing from those in Equations 1 and 2; a is greater than zero; and $(b^2 - 4 \cdot ac) < 0$.

At any rate, either one of Equations 1 through 3 may be used to approximately determine the peak value in the illustrated example. However, it is assumed in this example that the quadratic function is adopted for approximation of the peak value.

Now, the semiconductor laser device 21 is moved along the x-axis and the light power values are measured at measurement points along the x-axis by the sensor located at the second end of the optical fiber 23. The measurement points may be referred to as sampling points arranged on the x-axis hereinunder. For example, the positions $x_1$ to $x_4$ depicted at FIG. 3 may be called sampling points.

In FIG. 5(A), the adjustment operation is started and proceeds to a first step S11 at which a first one of the sampling points is determined by the controller 34. This means that an initial position of the semiconductor laser device 21 is determined along the x-axis as the first sampling point at the first step S11.

Thereafter, the controller 34 drives the light power measurement device 32 at the first sampling point to measure a first one of the light power values at the first sampling point at a second step S12. Thus, the optical fiber 23 and the semiconductor laser device 21 are relatively moved along the x-axis prior to measurement.

After the second step S12, the controller 34 calculates a second one of the sampling points that is spaced from the first sampling point by a predetermined distance or pitch in a positive direction, as shown at a third step S13. When the second sampling point is calculated at the third step S13, the controller 34 carries out a fourth step S14 at which the alignment stage 31, namely, the x-y stage is moved to the second sampling point. At the fourth step S14, the sensor is also driven to measure a second one of the light power values at the second sampling point.

At a fifth step S15, the controller 34 compares the first light power value with the second light power value to judge whether or not the second light power value is greater than the first light power value.

If the second light power value is greater than the first light power value, the fifth step S15 is followed by a sixth step S16 at which the controller 34 determines a third one of the sampling points that is shifted from the second sampling point by the predetermined distance in the positive direction. On the other hand, if the second light power value is not greater than the first light power value, the controller 34 executes a seventh step S17 to determine a third one of the sampling points spaced from the second sampling point by the predetermined distance in a negative direction.

After execution of either the sixth step S16 or the seventh step S17, the controller 34 moves the alignment stage to the third sampling point and measures a third one of the light power values at the third sampling point, as shown at an eighth step S18. The eighth step S18 is succeeded by a ninth step S19 illustrated in FIG. 5(B). At any rate, the light beam which is transmitted through the optical fiber 23 is measured at a plurality of sampling points or positions to determine the light power values at the respective positions, as in the conventional hill climbing method.

At the ninth step S19 in FIG. 5(B), the controller 34 calculates the coefficients of a quadratic function which passes the first through the third sampling points and which may be referred to as a specific quadratic function. The specific quadratic function can be obtained by substituting the light power values and the sampling points into Equation 1 and by determining the constants a, b, and c by using, for example, the least squares method. The controller 34 further determines a peak position or point at which the quadratic function exhibits a peak value (will be called a provisional maximum value). The peak point will be called a fourth point or a provisional maximum value position.

Subsequently, the ninth step S19 proceeds to a tenth step S20 at which the controller 34 moves the alignment stage to the peak point or the fourth point and makes the sensor measure a fourth one of the light power values at the fourth point. This operation is carried out on the assumption that a practical peak point of the light distribution is coincident with the fourth point of the quadratic function. In this connection, the fourth light power value may be referred to as a measured or a specific peak value.

The tenth step S20 is followed by an eleventh step S21 at which calculation is made to approximate the coefficients of the specific quadratic function with reference to the first through the third sampling points together with the newly measured results, namely, the fourth point and the fourth light power value obtained at the tenth step S20. Specifically, the approximate quadratic function is calculated by a method of least squares in consideration of the first through the third sampling points, the fourth point, and the first through the fourth light power values. Under the circumstances, the controller 34 provisionally judges that the approximate quadratic function represents the light power distribution and calculates a peak point of the approximate quadratic function as a calculated peak point.

At a twelfth step S22, the controller 34 calculates a difference between the fourth point obtained at the ninth step S19 and the calculated peak point obtained at the eleventh step S21 to detect whether or not the difference falls within a predetermined acceptable range.

If the difference falls within the predetermined acceptable range, the controller 34 proceeds to a thirteenth step S23 at which processing is carried out in relation to the y-axis. Otherwise, processing in the controller 34 is returned back to the tenth step S20. When the tenth step S20 is executed again, the calculated peak point is also considered in calculation of another calculated peak point at the eleventh step S21. Thus, five sampling points are used to calculate another calculated peak point at the next iteration of the eleventh step S21. This shows that the number of points is increased by one when the coefficients of the processing are returned back to the tenth step S20. At any rate, the specific quadratic function is modified to calculate another calculated peak point.

As mentioned before, the exponential function or the fractional function can also be used as the convex function instead of the quadratic function to approximate a peak point of the light distribution. However, since it is difficult to apply the method of least squares to the exponential or the fractional function, the hill-climbing method is used at the tenth step S20 to detect a top of each curve specified by the exponential or the fractional function and to decide the top as the peak point of the light distribution. Therefore, the eleventh and the twelfth steps S21 and S22 may be replaced by the operation mentioned above.

At the thirteenth step S23, a peak point along the y-axis is detected in a manner similar to that described in conjunction with the x-axis. Similar operation is also executed in connection with the z-axis.

Figure 6:
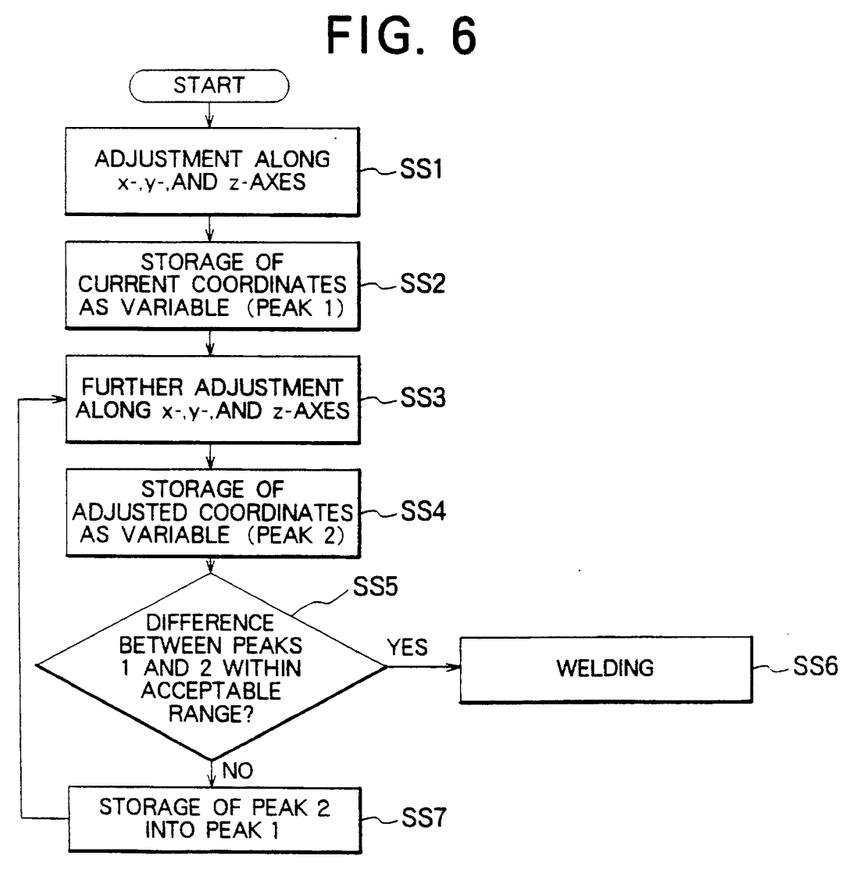
FIG. 6 is another flow chart for describing operation carried out after the operation illustrated in FIGS. 5(A) and 5(B)

Referring to FIG. 6, description will be made about adjusting the optical fiber 23 along three directions, namely, the x-axis, the y-axis, and the z-axis directions. In this event, the controller 34 executes a first processing step SS1 at which a position of the x-y stage is at first adjusted along the x-axis by calculating the peak point in the above-mentioned manner. Thereafter, positions along the y-axis and the z-axis are successively adjusted in the same manner. When the adjustment is individually completed in relation to all of the x-, the y-, and the z-axes, the positions along the x-, the y-, and the z-axes are stored in a memory included in the controller 34 and may be called an x-coordinate, a y-coordinate, and a z-coordinate, respectively, which are representative of individual current positions or coordinates.

Thereafter, the controller 34 stores the individual current coordinates as a variable named peak 1, as shown at a second processing step SS2 in FIG. 6. The second processing step SS2 is succeeded by a third processing step SS3 at which the controller 34 uses the x-coordinate, the y-coordinate, and the z-coordinate as individual initial positions of the semiconductor laser device 21 and the optical fiber 23 and further adjusts positions of the semiconductor laser device 21 and the optical fiber 23 in a manner similar to that mentioned in connection with the first processing step SS1. At the third processing step SS3, it is preferable that sampling distances are shorter than those at the first processing step SS1. When adjustment is completed at the third processing step SS3, the controller 34 stores an x-coordinate, a y-coordinate, and a z-coordinate adjusted at the third processing step SS3 as a variable named peak 2, as shown at a fourth processing step SS4.

After the fourth processing step SS4, the controller 34 compares the variable (peak 1) with the variable (peak 2) at a fifth processing step SS5 to judge whether or not the difference between the peaks 1 and 2 falls within an acceptable range.

If the difference falls within the acceptable range, the semiconductor laser device 21 and the optical fiber 23 are welded to be fixed together and to form the optical module, as shown at a sixth processing step SS6.

If the difference is outside of the acceptable range, contents of the peak 2 are stored as contents of the peak 1 at a seventh processing step SS7. Subsequently, processing is returned back to the third processing step SS3, and processing continues until a difference between the last two peaks is within the acceptable range.

Although the semiconductor laser device 21 is moved along the x-axis and the y-axis while the optical fiber 23 is moved along the z-axis in the illustrated example, it is possible to move the optical fiber 23 along the x-axis and the y-axis and the semiconductor laser device 21 along the z-axis. At any rate, the semiconductor laser device 21 and the optical fiber 23 may be relatively moved and adjusted to each other.

The above description has been restricted to three dimensional adjustment of the optical fiber 23 to the semiconductor laser device 21 along the x-, the y-, and the z-axes in the orthogonal coordinate system. However, it has been pointed out that the optical axis of the optical fiber 21 should be rotatably adjusted to the beam axis of the light beam emitted from the optical element 21, such as the semiconductor laser device, even if the optical fiber 23 is three-dimensionally adjusted to the beam axis of the optical element 21.

To this end, the optical fiber 23 is rotated around a rotation axis with the light beam emitted from the optical element 21 onto the first end of the optical fiber 23. The rotation axis may be the optical axis of the optical fiber 23. In this connection, the alignment stage 31 (FIG. 4) comprises a rotation mechanism together with the x-y stage and the z stage, although no description been made so far. Such adjustment based on rotation of the optical fiber 23 will be referred to as rotatable adjustment hereinunder.

The rotatable adjustment is carried out by monitoring a light power value in relation to an angle θ of the optical fiber 23 which is varied within a predetermined angle range, for example, between 0 and 2π (rad). The light power value is obtained by emitting the light beam from the optical element 21 and by measuring, at the second end of the optical fiber 23, the light beam transmitted through the optical fiber 23.

In general, when the optical fiber 23 is rotated around the optical axis relative to the optical element 21 within the predetermined angular range, the light power value takes a maximum light value and a minimum light value in relation to the angle θ and is continuously varied. In other words, the light power value exhibits a light power distribution in relation to the angle θ. This is because the optical axis of the optical fiber 23 is not completely aligned with the beam axis emitted from the optical element 21 or the like.

Thus, a similar problem occurs in connection with the rotatable adjustment like the three-dimensional adjustment mentioned above when a hill-climbing method is used to detect the maximum light value.

In the above description, although consideration has been made about the light beam transmitted through the optical fiber 23, a light power value incident onto the optical element 21 from the optical fiber 23 may be monitored when the optical element 21 is a light reception element. In this connection, such light power values may be collectively called a transmission quantity of light, although no description will be made about the light power value received by the optical element 21.

Figure 7:
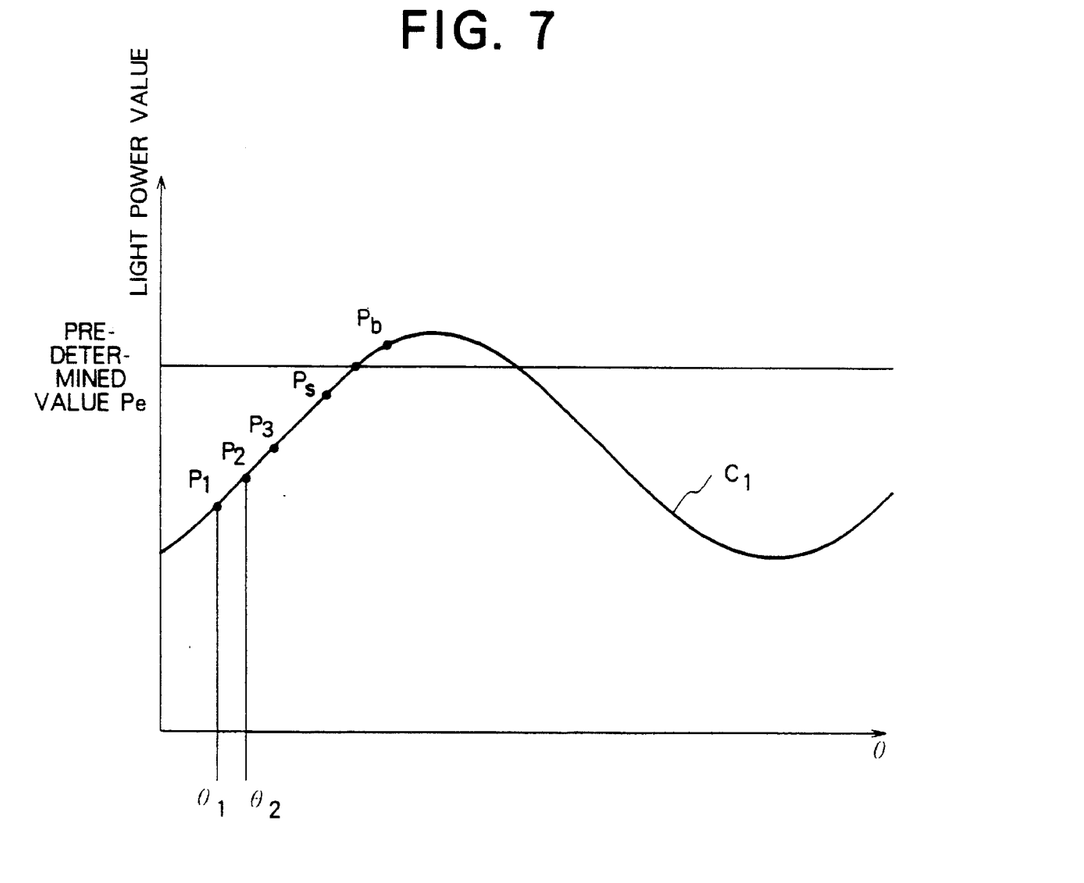
FIG. 7 is a graphical representation for use in describing the rotational method related to this invention.

Referring to FIG. 7 together with FIG. 1, the light power distribution along the optical axis of the optical fiber 23 is approximated by a curve C1 which has a maximum light value and a minimum light value when the optical fiber 23 is rotated around the optical axis thereof, as illustrated in FIG. 7. The curve C1 may be represented by a continuous function and is specified by a cosine function in the example. In this connection, the curve C1 is given by:

$$P = a \cdot \cos(\theta + \alpha) + b, \quad (4)$$

where P is representative of the light power value; θ, the rotation angle of the optical fiber 23; a, a coefficient; α and b, constants.

In addition, it is assumed that Equation 4 is approximated within the angle range given by $0 \leq \theta < 2\pi$ (rad).

In FIG. 7, a predetermined value Pe which is adjacent to the maximum light value is determined by comparing the light power value emitted by the optical element 21 with an output light power value transmitted through the optical fiber 23 and given to the sensor. Specifically, the predetermined value may be set to 35%–45% of the light power value emitted from the optical element 21.

In FIG. 4, it is assumed that the alignment stage 31 can rotate the optical fiber 23 while the controller 34 measures the rotation angle θ of the optical fiber 23 and carries out the rotatable adjustment with reference to the rotation angle θ in a manner to be described in detail. Moreover, the controller 34 is supplied with the light power value measured at the light power measurement device, namely, the sensor 32.

Figure 8:
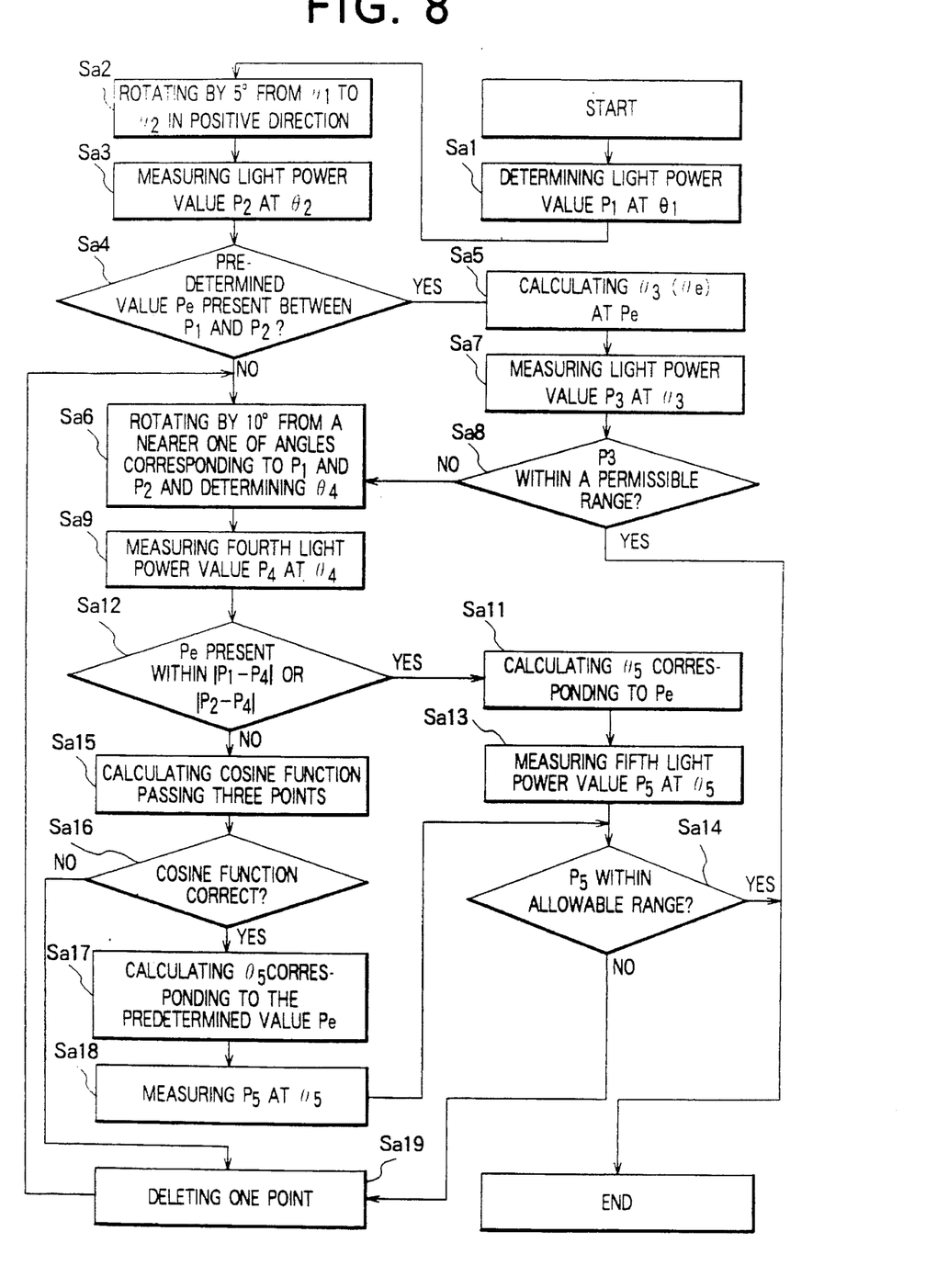
FIG. 8 is a flow chart for use in describing operation of a method according to a second embodiment of this invention.

Referring to FIG. 8 in addition to FIG. 7, the controller 34 starts the rotatable adjustment and detects an initial angle θ1 of the optical fiber 23 as the rotation angle θ at a first adjustment step Sa1. As the first adjustment step Sa1, an initial light power value P1 is supplied from the light power measurement device 32 to the controller 34 as the light power value P. As a result, the initial light power value P1 is stored in the controller 34 together with the initial angle θ1.

Thereafter, the optical fiber 23 is rotated around the rotation axis relative to the optical element 21 in a positive direction by the alignment stage 31 at a second adjustment step Sa2. At the second adjustment step Sa2 illustrated in FIG. 8, the alignment stage 31 is rotated from the initial angle θ1 by a predetermined angle of, for example, 5° in the positive direction. Thus, the rotation axis is put into a second angle θ2 remote from the initial angle θ1 by the predetermined angle, as shown at the second adjustment step Sa2.

At a third adjustment step Sa3, the light power value is measured as a second light power value P2 by the light power measurement device 32 at the second angle θ2. The second light power value P2 is sent to the controller 34 and stored therein together with the second angle θ2. Thereafter, the third adjustment step Sa3 is followed by a fourth adjustment step Sa4 at which the controller 34 compares each of the initial light power value P1 and the second light power value P2 with the predetermined value Pe to detect whether or not the predetermined value Pe is present between the initial light power value P1 and the second light power value P2.

If the predetermined value Pe is between the initial light power value P1 and the second light power value P2, as illustrated by Pb and Ps in FIG. 7, the fourth adjustment step Sa4 is succeeded by a fifth adjustment step Sa5 and, otherwise, the fourth adjustment step Sa4 is succeeded by a sixth adjustment step Sa6.

At the fifth adjustment step Sa5, the controller 34 calculates a third angle θ3 from the initial angle θ1, the second angle θ2, the initial light power value P1, and the second light power value P2 in relation to the predetermined value Pe. To this end, the controller 34 executes a ratio calculation in a following manner. Specifically, it is assumed that the initial light power value P1 is smaller than the second (bigger) light power value P2 and that the initial and the second light power values P1 and P2 are represented by Ps and Pb, respectively, for generality of description. Under the circumstances, a relationship among Pe, Pb, and Ps is given by Ps<Pe<Pb, as shown in FIG. 7.

If the rotation angles which correspond to the light power values Ps, Pe, and Pb are represented by θs, θe, and θb, respectively, the third angle θ3, namely, an angle θe corresponding to the predetermined value Pe is given by:

$$\theta e = ((Pe - Ps) \times \theta b + (Pb - Pe) \times \theta s)/(Pb - Ps). \quad (5)$$

After the angle θ3 is calculated by Equation 5, the controller 34 moves the alignment stage 31 to measure a third light power value P3 at the angle θ3 at a seventh adjustment step Sa7. The third light power value P3 is sent to the controller 34 and stored therein.

The controller 34 judges at an eighth adjustment step Sa8 whether or not the third light power value P3 falls within a permissible range. If the third light power value P3 is present within the permissible range, the controller 34 finishes the rotatable adjustment. Otherwise, the eighth adjustment step Sa8 is followed by the sixth adjustment step Sa6 which is also carried out when the predetermined value Pe falls outside of the range defined by the P1 and P2.

At the sixth adjustment step Sa6, the controller 34 drives the alignment stage 31 on the basis of a calculation result of the fourth adjustment step Sa4. More specifically, the controller 34 calculates absolute values of differences between the predetermined value Pe and the first light power value P1 and between the predetermined value Pe and the second light power value P2 and selects a smaller one of the absolute values of differences that corresponds to one of the initial angle θ1 and the second angle θ2 adjacent to a predetermined angle θe. This means that selection is made of the first or the second light power values P1 and P2, whichever is closer to the predetermined value Pe than the other.

Thereafter, the controller 34 rotates the optical fiber 23 by a preselected angle relative to the optical element 21 from the adjacent angle θ1 or θ2 that corresponds to the light power value P1 and P2 which is closer to Pe. In this event, relative rotation between the optical fiber 23 and the optical element 21 is made in a direction of the rotation axis such that the predetermined value Pe would be accomplished. The direction of the rotation axis may be called a predetermined value direction hereinunder. At the sixth adjustment step Sa6 illustrated in FIG. 8, the preselected angle is selected at 10°. Practically, the rotation axis is rotated by the preselected angle of 10° from the second angle θ2 in the example illustrated in FIG. 7 in the predetermined value direction. As a result, the rotation angle is put into a fourth angle θ4.

Herein, the controller 34 determines the predetermined value direction by calculating |P1−Pe| and |P2−Pe| which may be denoted by A and B, respectively, and by comparing A with B. In this event, when A≦B, it is assumed that the rotation axis is rotated in a negative direction along which the angle of the rotation axis is reduced. On the other hand, when A>B, the rotation axis is rotated in a positive direction along which the angle of the rotation axis is increased.

The sixth adjustment step S6 is succeeded by a ninth adjustment step S9 at which a fourth light power value P4 is measured with the rotation axis rotated by the fourth angle θ4. The measured fourth light power value P4 is sent to the controller 34 together with the fourth angle θ4 to be stored therein.

In this situation, it is noted that the controller 34 memorizes the predetermined value Pe, the first and the second light power values P1 and P2, and the fourth light power value P4.

Now, the ninth adjustment step Sa9 is followed by a tenth adjustment step Sa10 at which the controller 34 compares the predetermined value Pe with the respective light power values. Specifically, the controller 34 judges at the tenth adjustment step Sa10 whether the predetermined value Pe is present within first and second ranges between the first and the fourth light power values P1 and P4 or between the second and the fourth light power values P2 and P4 or is present outside of the first and the second ranges. If the predetermined value Pe is present within the first and the second ranges, the tenth adjustment step Sa10 is succeeded by an eleventh adjustment step Sa11. Otherwise, the tenth adjustment step Sa10 is followed by a fifteenth adjustment step Sa15.

At the eleventh adjustment step Sa11, the controller 34 calculates a fifth angle θ5 which corresponds to the predetermined value Pe by the use of ratio calculation.

If the predetermined value Pe falls within the first range between the first and the fourth light power values P1 and P4, calculation is carried out in accordance with Equation 5 to determine the fifth angle θ5 which corresponds to the predetermined value Pe. In Equation 5, a smaller one of the first and the fourth light power values P1 and P4 is determined as Ps while a greater one of the first and the fourth light power values P1 and P4 is determined as Pb.

On the other hand, if the predetermined value Pe falls within the second range between the second and the fourth light power values P2 and P4, similar calculation is carried out by the use of Equation 5 with a smaller one of the second and the fourth light power values P2 and P4 kept as Ps and with a greater one of the second and the fourth light power values P2 and P4 kept as Pb.

In any event, the fifth angle θ5 is decided, at the eleventh adjustment step Sa11, as a new angle θe corresponding to the predetermined value Pe.

Thereafter, a thirteenth adjustment step Sa13 follows the eleventh adjustment step Sa11 to measure a fifth light power value P5 at the fifth angle θ5. To this end, the light power value measurement device 32 is driven at the thirteenth adjustment step Sa13 to measure the fifth light power value P5. The fifth light power value P5 is sent to the controller 34 and memorized therein.

At a fourteenth adjustment step Sa14, the controller 34 judges whether or not the fifth light power value P5 falls within an allowable range predetermined. As a result of judgement, when the fifth light power value P5 is present within the allowable range, the rotatable adjustment comes to an end. Otherwise, the following operation is carried out by the controller 34.

When the controller 34 judges at the tenth adjustment step Sa10 that the predetermined value Pe falls outside of the first and the second ranges between the first and the fourth light power values P1 and P4 and between the second and the fourth light power values P2 and P4, the tenth adjustment step Sa10 is followed by a fifteenth adjustment step Sa15. At the fifteenth adjustment step Sa15, the controller 34 calculates the coefficients of a cosine function which passes three points. The three points in the illustrated example are specified by the first angle θ1, the second angle θ2, and the fourth angle θ4 and the corresponding first, second, and fourth light power values P1, P2, and P4.

In this event, the controller 34 at first substitutes the above-mentioned angles and power values into Equation 4. Consequently, Equation 4 is rewritten into:

$$P1 = a \cdot \cos(\theta 1 + \alpha) + b, \quad (6)$$

$$P2 = a \cdot \cos(\theta 2 + \alpha) + b, \text{ and} \quad (7)$$

$$P4 = a \cdot \cos(\theta 4 + \alpha) + b, \quad (8)$$

Subsequently, the controller 34 solves equations of the first degree with three unknowns a, b, and α and calculates values of a, b, and α to determine the coefficients of the cosine function which may be called a specific or a determined cosine function.

After calculation of the values of a, b, and α, the controller 34 carries out a sixteenth adjustment step Sa16 to judge whether or not the coefficients of the cosine function determined at the fifteenth adjustment step Sa15 are correct.

It is mentioned here that the correct cosine function satisfies the following inequalities:

b−a<0 and a+b<Pe.

If the determined coefficients are correct, the controller 34 executes a seventeenth adjustment step Sa17 to calculate, by the use of the determined cosine function, a fifth angle θ5 which corresponds to the predetermined value Pe and which is determined as an angle θe. In this event, the angle θe can be calculated by substituting the values Pe, a, b, and α into:

$$Pe = a \cdot \cos(\theta e + \alpha) + b.$$

Otherwise, the operation which will be presently described is carried out by the controller 34.

When the fifth angle θ5 is calculated at the seventeenth adjustment step Sa17, a fifth light power value P5 is measured by the light power value measurement device 32 at an eighteenth adjustment step Sa18 and is sent to the controller 34 to be memorized therein.

The eighteenth adjustment step Sa18 is followed by the fourteenth adjustment step Sa14 to judge whether or not the fifth light power value P5 falls within the allowable range, as mentioned before.

When the fifth light power value P5 is present within the allowable range, the angular adjustment is finished. However, the fourteenth adjustment step Sa14 is succeeded by a nineteenth adjustment step Sa19 in order to search for another point, if the fifth light power value P5 is judged as being not acceptable at the fourteenth adjustment step Sa14.

To this end, the controller 34 deletes one point from the above-mentioned three points at the nineteenth adjustment step Sa19. More specifically, the three points are specified at the nineteenth adjustment step Sa19 by the first, the second, and the fifth light power values P1, P2, and P5 and the corresponding first, second, and fifth angles θ1, θ2, and θ5. The controller 34 calculates differences between the predetermined value Pe and each of the first, the second, and the fifth light light power values P1, P2, and P5 to obtain absolute values of the differences. Thereafter, the controller 34 selects the largest one of the absolute values and deletes one of the first, the second, and the fifth angles that corresponds to the largest absolute value. The remaining two angles become the new first and second new angles θ1 and θ2, while light power values corresponding to the first and second new angles θ1 and θ2 are determined as first and second new light power values.

After completion of the nineteenth adjustment Sa19, the operation is returned back to the sixth adjustment step Sa6 to determine a fourth new angle θ4 to rotate the alignment stage 31 in either one of the positive and the negative directions by 10° and to provide first and second new light power values P1 and P2. Thereafter, similar operation is carried out in the manner mentioned above.

The direction of rotation is determined in the following manner. Namely, let |P1−Pe| and |P2−Pe| be represented by A and B, respectively. Under the circumstances, the rotation axis is rotated in the negative direction when A≦B and θ1≦θ2 or when A>B and θ1>θ2 but it is rotated in the positive direction when A≦B and θ1>θ2 or when A>B and θ1≦θ2.

Thus, when the rotatable adjustment is completed in the above-mentioned manner, the optical fiber 23 and the optical element 21 are welded together by the welding equipment 33 (FIG. 4) and assembled into the optical module.

In the above-mentioned example, when the light quantity emitted from the optical element 21 is varied, the predetermined value Pe may be changed in accordance with the variation of the light quantity.

Although the rotatable adjustment has been made in relation to the predetermined value Pe in the illustrated example, the maximum light value may be detected in the manner mentioned in conjunction with FIGS. 5 and 6. In this connection, the predetermined value or the maximum light value may be referred to as an optimum value.

While this invention has thus far been described in conjunction with a few embodiments thereof, it will readily be understood for those skilled in the art to put this invention into practice in various other manners. For example, many other functions, such as a sine function, may be used to approximate the light distribution on the angular adjustment instead of the cosine function. This invention may be also applicable to optical alignment between a light emitting diode and an optical fiber, between an optical fiber and an optical fiber, and between a light reception element and an optical fiber. In this connection, the optical element may be the optical fiber, the light emitting diode, the light reception element, or the like. When the optical reception element is used as the optical element 21, the light power value received by the optical element 21 may be processed in the above-mentioned manner for the rotatable adjustment.

At any rate, since a prescribed function is used to approximate the distribution of light, three-dimensional alignment or rotatable adjustment between optical axes can be carried out within a short time. In addition, it is possible to reduce measurement times for measuring light power values.

What is claimed is:

1. A method of adjusting an optical fiber to an optical element to align an optical axis of said optical fiber with a beam axis of a light beam emitted from said optical element, said optical fiber having a first end adjacent to said optical element and a second end remote from said optical element, the method comprising the steps of:

relatively moving said optical fiber and said optical element so that the light beam is transmitted through said optical fiber from the first end to the second end and has a light distribution on the second end;

selecting a convex function which approximates said light distribution and which has a peak value when said light distribution has a maximum value at a maximum value position;

measuring said light beam transmitted through the optical fiber at a plurality of positions on the second end to obtain measured results of the light beam at the respective positions;

determining a set of coefficients of the convex function such that the convex function passes through the measured points;

determining a specific position of the peak value of the convex function by substituting said measured results into said convex function;

relatively moving said optical fiber and said optical element to the specific position;

measuring the light beam at the specific position of the peak value to obtain a specific measured result measured at the specific position;

modifying the set of coefficients of the convex function and the specific position to determine a modified specific position on the basis of the specific position, the specific measured result, and the measured results; and aligning the optical axis of the fiber with the beam axis of the optical element with reference to said modified specific position.

2. A method as claimed in claim 1, wherein the modifying step comprises the steps of:

calculating a difference between the specific position and the modified specific position;

judging whether or not the difference falls within an acceptable range;

using the modified specific position to align the optical axis with the beam axis when the difference falls within the acceptable range; and remeasuring the light beam at said modified specific position to obtain a specific remeasured result when the difference falls outside of the acceptable range and to use the specific remeasured result as the specific measured result in said modifying step.

3. A method as claimed in claim 1, wherein said optical axis of the optical fiber is aligned with the beam axis of the light beam in a three-dimensional space defined by an x-axis, a y-axis, and a z-axis which are orthogonal to one another, the method being individually carried out along each of the x-axis, the y-axis, and the z-axis.

4. A method as claimed in claim 1, wherein said convex function is a function selected from a group consisting of a quadratic function, an exponential function, and a fractional function.

5. A method of adjusting an optical fiber to an optical element to align an optical axis of said optical fiber with a beam axis of a light beam emitted from said optical element, said optical fiber having a first end adjacent to said optical element and a second end remote from said optical element, the method comprising the steps of:

relatively moving said optical fiber and said optical element so that the light beam is transmitted through said optical fiber from the first end to the second end;

measuring the light beam transmitted through said optical fiber at a plurality of positions on the second end to obtain measured values of the light beam at the respective positions;

determining a convex function which approximates the measured values and the respective positions and which has a provisional maximum value at a provisional maximum value position; and aligning the optical axis with the beam axis by the use of the provisional maximum value and the provisional maximum value position.

6. A method as claimed in claim 5, wherein the aligning step comprises the step of:

relatively positioning the optical fiber and the optical element to said provisional maximum value position.

7. A method as claimed in claim 5, wherein the aligning step further comprises the steps of:

measuring the light beam at said provisional maximum value position to obtain a specific measured value in lieu of said provisional maximum value; and redetermining a further maximum value and the corresponding further maximum value position of the convex function with reference to the specific measured value and the measured values which are measured at the provisional maximum value position and the plurality of the positions.

8. A method as claimed in claim 7, wherein the aligning step further comprises the steps of:

judging whether or not each of the provisional and the further maximum value positions falls within an allowable range;

repeating the measurement step of the light beam when each of the provisional and the further maximum value positions falls outside of said allowable range; and completing the alignment of the optical axis with the beam axis when each of the provisional and the further maximum value positions falls within the allowable range.

9. A method of rotatably adjusting an optical fiber to an optical element to transmit a light beam between the optical fiber and the optical element, said optical fiber having an end and an optical axis, said light beam being transmitted between the optical fiber and the optical element in a transmission quantity of light which has an optimum value and a light distribution when said optical fiber is rotated around said optical axis relative to said optical element, the method comprising the steps of:

selecting a family of continuous functions, each of said continuous functions within said family approximating said light distribution;

measuring the transmission quantity of light at a plurality of angle positions around the optical axis on said end to obtain measured results at the respective angle positions;

determining a specific continuous function from said family, wherein said specific continuous function corresponds to said measured results; and calculating a rotation angle between the optical fiber and the optical element on the basis of the specific continuous function so that the transmission quantity of light becomes substantially equal to said optimum value.

10. A method as claimed in claim 9, wherein each of said continuous function in the family has a maximum and a minimum value.

11. A method as claimed in claim 10, wherein the specific continuous function is specified by a cosine function.

12. A method as claimed in claim 10, wherein the optimum value is selected at a predetermined value close to said maximum value.

13. A method as claimed in claim 10, wherein the optimum value is equal to said maximum value.

14. A method of rotatably adjusting an optical fiber to an optical element to transmit a light beam between the optical fiber and the optical element, said optical fiber having an end and an optical axis, said light beam being transmitted between the optical fiber and the optical element in a transmission quantity of light which has a predetermined value and a light distribution when said optical fiber is rotated around said optical axis relative to said optical element, the method comprising the steps of:

selecting a family of continuous functions, each of said continuous functions within said family approximating said light distribution and each of which has a minimum value and a maximum value greater than said predetermined value;

measuring the transmission quantity of light at a plurality of angle positions around the optical axis on said end to obtain measured results at the respective angle positions;

determining a specific continuous function from said family, wherein said specific continuous function corresponds to said measured results;

calculating a rotation angle between the optical fiber and the optical element on the basis of the specific continuous function;

remeasuring the transmission quantity of light at the rotation angle calculated, to obtain a specific measured value; and adjusting the optical fiber to the optical element by the use of the specific measured value.

15. A method as claimed in claim 14, wherein said adjusting step comprises the steps of:

judging whether or not the specific measured value falls within an allowable predetermined range;

detecting a farthest one of the measured results from said predetermined value when the specific measured value falls outside of the allowable range;

deleting said farthest one of the measured results keeping the remaining measured results; and calculating another rotation angle by the use of the remaining measured results and the specific measured value to rotatably adjust the optical fiber to the optical element.

* * * * *